United States Patent Office 3,000,925
Patented Sept. 19, 1961

---

3,000,925
ALKYLENE-BIS-BORACYCLOOCTANE PREPARATION
Bernard Rudner and Mead S. Moores, Pittsburgh, Pa., assignors to Koppers Company, Inc., a corporation of Delaware
No Drawing. Filed June 20, 1960, Ser. No. 37,073
7 Claims. (Cl. 260—462)

This invention relates to the preparation of bicyclic boracyclooctanes. In one specific aspect, it relates to the preparation of esters comprising two unfused boron-containing heterocyclic rings connected by an alkylene bridge, by the reaction of an alcohol with an N,N,N',N'-tetrakis (2-dihydroxyboroxyalkyl)alkylenediamine.

In our copending application Serial No. 860,071, filed December 17, 1959, and in copending application Serial No. 37,070, filed even date herewith which is a continuation-in-part of said application, we described and claimed a new class of alkylene-bis-boracyclooctanes having the general formula:

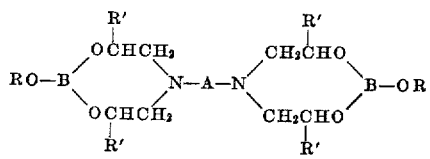

In the above formula R is a member selected from the group consisting of alkyl radicals having from 1–20 carbon atoms, epoxy lower alkyl, furfuryl, tetrahydrofurfuryl and hydroxy lower alkyl, R' is hydrogen or lower alkyl and A is a divalent normal lower alkylene chain having from 2–6 carbon atoms which is attached to each nitrogen atom through a different carbon atom. These compounds have remarkable resistance to ring rupture by alcoholysis and, because of the two acyclic ester groups that they contain, are directly useful as major components in the formation of novel hydrolytically stable condensation polymers described and claimed in our copending application Serial No. 860,064, filed December 17, 1959. Quite surprisingly, we have found that a specific class of the above compounds, generally those in which R' is lower alkyl, can be made by a novel reaction involving the cyclization of an N,N,N',N'-tetrakis(2-dihydroxyboroxyalkyl)alkylenediamine.

It is therefore an object of the present invention to provide a new route to certain of the alkylene-bis-boracyclooctanes, compounds which are useful, inter alia, in the direct preparation of new hydrolytically stable condensation polymers having remarkable utility as thickeners, fillers and surface modifiers.

In accordance with the invention, alkylene-bis-boracyclooctanes of the formula:

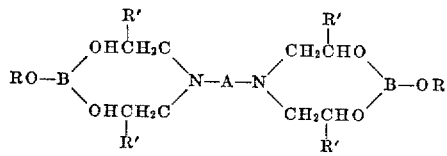

wherein R is a member selected from the group consisting of alkyl radicals having from 1–20 carbon atoms, furfuryl, tetrahydrofurfuryl, benzyl and cyclohexyl, R' is lower alkyl, and A is a divalent normal lower alkylene chain having from 2–6 carbon atoms which is attached to each nitrogen atom through a different carbon atom;

are made by reacting an N,N,N',N'-tetrakis(dihydroxyboroxyalkyl)alkylenediamine of the formula:

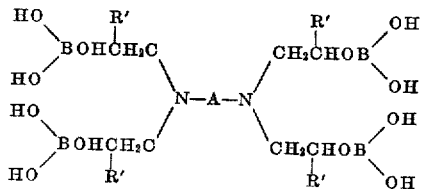

wherein R' is lower alkyl, and A is a divalent normal lower alkylene chain having from 2–6 carbon atoms which is attached to each nitrogen atom through a different carbon atom, with an alcohol of the formula ROH, wherein R is a member selected from the group consisting of alkyl radicals having from 1–20 carbon atoms, furfuryl, tetrahydrofurfuryl, benzyl and cyclohexyl, at an elevated temperature, removing water from the reaction mixture substantially as it is formed and recovering from the residue the product alkylene-bis-boracyclooctane. The new reaction is shown below in Equation I.

(I)
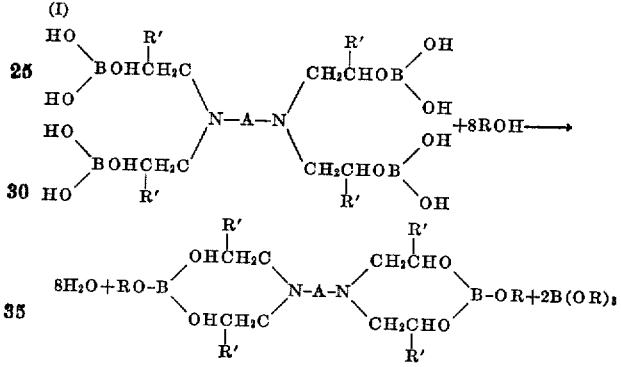

In the above equation R, R' and A have the values given aforesaid.

The starting materials for use in the invention, the N,N,N',N'-tetrakis(dihydroxyboroxyalkyl)alkylenediamines are conveniently prepared by the method described and claimed in copending application Serial No. 37,071 of Mead S. Moores, filed even date herewith. That method involves the reaction of boric acid with a tetrol, i.e. a N,N,N',N'-tetrakis(2-hydroxyalkyl)alkylenediamine. Several of such diamines are commerically available and others are readily prepared by simple and straightforward procedures, e.g. the reaction of an alkylene diamine with an alkylene chlorohydrin. An alternate method of preparing the N,N,N',N'-tetrakis(dihydroxyboroxyalkyl)alkylene diamines is disclosed in our copending application Serial No. 37,072, filed even date herewith.

Any alcohol that readily forms a borate on being heated with boric acid in the presence of a catalyst is capable of undergoing this reaction. Thus, alcohols useful in the invention include methyl, ethyl, isopropyl, butyl, 2-ethylhexyl, commercial tridecyl alcohol, cetyl, cyclohexyl, benzyl, 2-chloro benzyl, furfuryl and tetrahydrofurfuryl alcohols. Compounds similar to those made by the method of the invention should be formed using unsaturated acyclic alcohols such as allyl alcohol and carbocyclic alcohols such as cyclopentyl carbinol. Glycols and polyols are ineffective in the invention, since they give higher condensates and polymers rather than compounds of the desired structure.

To obtain the best yields, it is desirable to use at least a stoichiometric quantity of alcohol, based upon the amount of tetrakis (dihydroxyboroxyalkyl)alkylenediamine; in fact, the use of a greater amount of alcohol is often helpful in providing a solvent for the reaction or in removing the water from the reaction mixture as is hereafter described.

It is important for purposes of the invention to remove the water from the reaction mixture substantially as it is formed, since failure to do so causes at least a partial reversal of the reaction. It is not necessary to effect immediate removal of the coproduct alkyl borate, although the presence of the alkyl borate is sometimes detrimental if water is also present in the reaction mixture. Certain of the lower alkyl borates are more readily attacked by water than is the desired alkylene-bisboracyclooctane.

Water is effectively removed from the reaction mixture by using (1) heat or (2) a drying agent. Heat can be used to remove the water with or without distillation of the reaction mixture. For example, one can simply mix the alcohol and the tetrakis(dihydroxyboroxyalkyl) alkylenediamine and heat directly, with or without use of vacuum, until the mixture attains a constant weight, whereby the water and trialkyl borate are driven off and the reaction goes essentially to completion. Distillation is more practical since it permits collection of the distillate, which can be then analyzed to determine the extent to which reaction has progressed. Drying agents effective for the removal of water include anhydrous magnesium sulfate, alumina, silica and molecular sieves.

It is often convenient, although not essential, to use a solvent for the reaction. The choice of a particular solvent depends to a large extent on the manner in which the water is to be removed from the reaction mixture and on the contemplated method of recovering the desired product. As we have noted, a good solvent is an excess of the alcohol used as a reactant. Since water forms an azeotrope with most of the alcohols used in the invention, a convenient way of removing the water involves subjecting the mixture to continuous distillation, separating the alcohol-water azeotrope, removing the water and recycling the alcohol. As mentioned hereabove, the amount of alcohol used is influenced by the means used to remove water from the reaction mixture. If water is to be removed as an alcohol-water azeotrope, the minimum quantity of alcohol needed is 8 moles of alcohol per mole of tetrakis(dihydroxyboroxyalkyl)alkylenediamine plus that amount of alcohol necessary to form an azeotrope with 8 moles of water.

Other solvents useful in the invention include those inert solvents capable of forming a binary azeotrope with water or a ternary azeotrope with water and alcohol, such as hydrocarbons, e.g. cyclohexane, xylene and the like; halohydrocarbons, e.g. chloroform; ethers, e.g. 2-methyl furan and the like. Solvents which do not form azeotropes and which boil higher than the water, such as nitrobenzene, diglyme, dichlorobenzene, dimethylacetamide, and mineral oil can also be effectively used.

Any elevated temperature is sufficient to effect reaction although, as we have noted hereabove, reaction conditions must be selected which provide for substantially immediate removal of the water. When an excess of an azeotrope-forming alcohol is used as a solvent, a convenient reaction temperature is the reflux temperature of the reaction mixture under the pressure used, since the use of such a temperature permits continuous distillation of the alcohol-water azeotrope. Generally speaking, useful reaction temperatures of the invention range between 50 and 180° C.; preferably between about 60 and 100° C.

The reaction is preferably run at atmospheric pressure, although the choice of pressure depends to a large extent upon the economical removal of the water formed during the reaction. Since the forward progress of the reaction depends upon the removal of at least one and sometimes two volatile products, it is more advantageous to run the reaction at atmospheric or subatmospheric pressures than at superatmospheric pressure. Even with relatively non-volatile trialkyl borates, it is not necessary to use high vacuum; a reduced pressure ranging from about 10 mm. of Hg up to substantially atmospheric pressure is suitable.

Reaction is continued until the substantially theoretical amount of water has been removed from the reaction mixture.

After removal of the substantially theoretical quantity of water, the product alkylene-bis-boracyclooctane is recovered from the residue by conventional techniques. Conveniently, distillation is continued until the excess alcohol is removed. Where the alcohol used is methyl or ethyl alcohol, the coproduct trialkyl borate can be removed as its azeotrope with the alcohol. In the case of higher alcohols, the trialkyl borate can be removed by distillation under reduced pressure. After removal of the alcohol, the residue can be evaporated in vacuo to recover the coproduct trialkyl borate. The alkylene-bis-boracyclooctane can then be recovered by cooling the residue, adding thereto a non-solvent such as ether and precipitating the product from the mixture thus obtained. The product can be then recovered by filtration and if desired, additional product can be obtained by evaporation of the filtrate.

In addition to their use as polymer formers, the compounds made by the novel method of the invention are of value in retarding phenolformaldehyde condensation beyond the first step. Thus, a solution made by mixing resorcinol, formaldehyde and 1,2-bis-(3,7-dimethyl-5-methoxy - 5 - bora-4,6-dioxa-1-azacyclooctyl - 1)ethane in water, is stable in storage at up to about 60° C.; addition of acid or alkali results in the formation of a resorcinol-aldehyde condensate containing basic nitrogen. In the absence of our product, resorcinol condenses rapidly with formaldehyde below 60° C., and the presence of a simple amine borate such as triethanolamine borate does not inhibit this condensation.

The polymer-forming properties of the heterocyclic compounds made by our new method also make them useful in animalizing vegetable fibers. Thus, paper impregnated with an aqueous solution of the product of 1,2-bis-(3,7-dimethyl-5-methoxy - 5 - bora - 4,6 - dioxa-1-azacyclooctyl-1)ethane, then vacuum-dried at 80° C. not only exhibits increased flame resistance, but also shows much greater affinity for acidic dyes than does untreated paper. The same desirable effects can be achieved by heating the paper with the parent tetrakis-(2-dihydroxyboroxyalkyl)alkylenediamine:

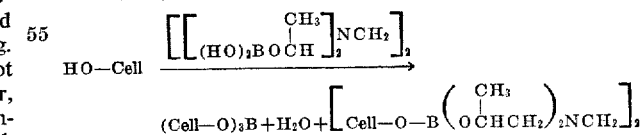

Our invention is further illustrated by the following examples.

Example I

Dry n-butanol, 500 ml., containing N,N,N',N'-tetrakis-(2-dihydroxyboroxypropyl)ethylenediamine (100 g.— 0.214 m.) was distilled through a Vigreux column. The lower (aqueous) layer of azeotrope was collected in a suitable receiver and the upper layer (butanol) was returned to the reaction mixture. After removal of the azeotrope, distillation was continued until 100 ml. of clear n-butanol had been collected. The total amount of water collected was 31.0 g., 101% of the theoretical yield. The pot residue was evaporated in vacuo at 80–90° C.; tri-n-butyl borate distilled out during this operation. The cooled residue was triturated with ether and 78.1 g. of 1,2-bis(5-butoxy-3,7-dimethyl-1-aza-5-bora-4,6-dioxa-1-cyclooctyl)ethane precipitated therefrom. Evaporation of the filtrate gave an additional 8.1 g.; the total representing 88.5% of the theoretical according to the equation:

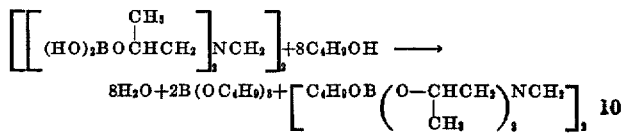

Example II

N,N,N',N' - tetrakis - (2 - (dihydroxyboroxy)propyl)-ethylenediamine, 23.4 g. (0.05 m.) was heated in 500 ml. refluxing anhydrous methanol until the vapor temperature fell to 56° C. (the distillation temperature of the methyl borate-methanol azeotrope). It was then distilled through a Vigreux column, at a reflux ratio of approximately 5:1, to collect 21 ml. of distillate, B.P. 56.8–58.5° C., in approximately ¾ hour. The distillate contained very nearly the theoretical amount of methyl borate required according to Equation I, supra. Careful dehydration of the clear solution in the distillation either by azeotroping with chloroform or drying with MgSO₄, gave 1,2-bis-(5-methoxy-3,7-dimethyl-1-aza-5-bora-4,6-dioxa-cyclooctyl)-ethane. If, however, heating is continued without removal of water, the yield of desired product decreases, as shown by the following two experiments.

Example III

Azeotropic distillation, as in Example II above, was maintained until the vapor temperature at the head of the column reached 64° C. (the boiling point of pure methanol at the prevailing atmospheric pressure); in all, 50 ml. of distillate was collected in 58 minutes. The distillate was found by analysis to contain 14.8 g. (0.142 mole) of methyl borate. Since only 10.4 g. (0.10 mole) could come from the reaction, the rest was derived from solvolysis of the product, first by a reversal of the reaction, and then by alcoholysis of the tetramonoborate as shown in Equation I. Attempts to isolate a product from the residue of distillation by drowning the clear solution in ether-hexane (1:10) after drying over MgSO₄ gave a glassy mixture of tetrakis-(2-hydroxypropyl)ethylenediamine and product alkylenebisboracyclooctane.

Example IV

When a refluxed and distilled methanolic solution obtained by mixing the reactants of Example II was evaporated dry at about 30° C. under aspirator vacuum, water was not removed sufficiently fast to prevent rehydrolysis of the product alkylenebisboracyclooctane. The aspirator distillate contained methyl borate, but in much less than the stoichiometric amount. The brittle white evaporative residue was a mixture of starting compound and the tetrahydroxypropylethylene diamine.

We claim:

1. A method of making alkylene-bis-boracyclooctanes of the formula:

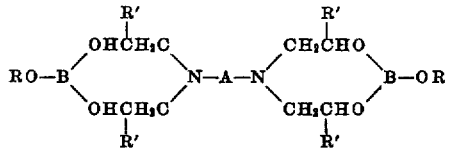

wherein R is a member selected from the group consisting of alkyl radicals having from 1–20 carbon atoms, furfuryl, tetrahydrofurfuryl, benzyl, and cyclohexyl, R' is lower alkyl and A is a divalent normal lower alkylene chain having from 2–6 carbon atoms which is attached to each nitrogen atom through a different carbon atom, comprising reacting an N,N,N',N'-tetrakis(dihydroxyboroxyalkyl)alkylenediamine of the formula:

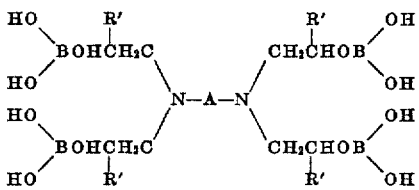

wherein R' and A are as defined aforesaid with an alcohol of the formula ROH, wherein R is as defined aforesaid at an elevated temperature, removing water from the reaction mixture substantially as it is formed during the reaction, and recovering said alkylene-bis-boracyclooctane from the residue.

2. Method according to claim 1 wherein the alcohol is present in at least an amount corresponding to the stoichiometric requirement plus that amount of alcohol required to form an azeotrope with the water formed during the reaction.

3. Method according to claim 2 wherein an excess of the reactant alcohol is used as a solvent and water is removed as it is formed by distillation of the alcohol-water azeotrope from the reaction mixture.

4. Method according to claim 1 wherein the reaction temperature is maintained between 50 and 180° C.

5. Method according to claim 1 wherein water is removed with the use of a drying agent.

6. Method according to claim 1 wherein an inert solvent, capable of forming a azeotrope with water, is present in the reaction mixture.

7. Method according to claim 1 wherein R is an alkyl radical having from 1–20 carbon atoms.

No references cited.